(12) United States Patent
Yonemura

(10) Patent No.: US 6,378,772 B1
(45) Date of Patent: Apr. 30, 2002

(54) ROAD MARKER MAGNETIZING METHOD

(75) Inventor: Ryugen Yonemura, Osaka (JP)

(73) Assignee: Public Works Research Institute, Ibaraki-Ken (JP)

(*) Notice: Subject to any disclaimer, the term of this patent is extended or adjusted under 35 U.S.C. 154(b) by 0 days.

(21) Appl. No.: 09/365,312

(22) Filed: Jul. 30, 1999

(30) Foreign Application Priority Data

Jul. 31, 1998 (JP) .......................................... 10-216978

(51) Int. Cl.[7] ................................................ G07B 15/02
(52) U.S. Cl. ...................................... 235/384; 235/449
(58) Field of Search ................................ 235/449, 384, 235/493

(56) References Cited

U.S. PATENT DOCUMENTS 6,097,312 A * 8/2000 Tanji et al. ................ 340/905

FOREIGN PATENT DOCUMENTS

| JP | 10162300 A | * | 6/1998 |
| JP | 4101542295 A | * | 6/1998 |
| JP | 02001101588 A | * | 4/2001 |

* cited by examiner

Primary Examiner—Karl D. Frech
(74) Attorney, Agent, or Firm—Fulbright & Jaworski L.L.P.

(57) ABSTRACT

A method and device for magnetizing road markers for giving road information to vehicles in which the road markers are embedded in a road and later magnetized according to a pattern corresponding to coded road information.

9 Claims, 7 Drawing Sheets

ROAD MARKER MAGNETIZING METHOD

BACKGROUND OF THE INVENTION

1. Field of the Invention

The present invention relates to a method for magnetizing a road marker to provide road information such as the state or form of a road to a vehicle traversing the road. Such road markers are useful for automated piloting of vehicles and other purposes known in the art.

2. Description of the Prior Art

In recent years, various types of technology have evolved for automatically piloting a vehicle. In the typical application, the vehicle is piloted by supplying road information to an electronic unit on the vehicle that controls throttling, steering, and braking. Typical of these devices is the invention by the present inventor described in Japanese Patent Application No. 8-918314.

One of the technologies used for supplying road information is the use of magnetic markers attached to or embedded within a road. Examples of this technology are described in U.S. Pat. No. 5,347,456 and PCT International Publication W.O. No. 92/08176. Magnetic marker technology typically uses a plurality of magnetic markers that have been previously magnetized with an N polarity or an S polarity and are subsequently embedded within a road. The premagnetized markers are embedded in a road so that they create a pattern corresponding to coded road information. By detecting this magnetic pattern, the vehicle detects necessary road information.

While the use of pre-magnetized markers as described above has successfully been used with automatically piloted vehicles, it has several disadvantages. In the first instance, the installation of pre-magnetized markers is precise, tedious work in that the correct spatial placement of correctly polarized markers is critical to system functionality. Also, once embedded, the information conveyed by the marker is fixed making it difficult to upgrade the overall system to provide additional information beyond that originally contemplated. In prior art systems using pre-magnetized markers, changing the information to be conveyed by a marker required digging out the embedded magnetic markers and re-embedding different pre-magnetized markers to properly convey the new road information.

Another disadvantage of the pre-magnetized markers of the prior art is the difficulty in cleaning off iron pieces or iron powder attracted to the marker due to leaked magnetic flux. When a magnetic road marker is embedded in a road and left there for a period of time, many foreign materials are attracted to the place in the road where the magnetic marker is embedded. This has the effect of disturbing the magnetic flux from the marker, which introduces errors into the road information detected by a vehicle.

Some prior art systems tried to correct the foreign material problem by weakening the magnetism of the embedded road marker to a level where, even if materials are naturally attracted to the place in the road where the magnetic marker is embedded, forces of nature are sufficiently strong to remove the foreign material. However, with this configuration, the magnetism of the marker is often so weak that the road information cannot be detected by a vehicle.

OBJECTS AND SUMMARY OF THE INVENTION

To overcome the deficiencies of the prior art, it is a first object of the present invention to provide an in situ road marker magnetizing method so that road markers can be embedded in road surfaces during construction without concern for their magnetic strength or polarization. It is a second object of the present invention to provide an in situ road marker magnetizing method so that the road information conveyed by embedded road markers is easily changed without the need to dig out and re-embed the markers. It is a third object of the present invention to provide an in situ road marker magnetizing method that makes it possible to easily remove foreign materials attracted by leaked magnetic flux while at the same time preserving full magnetic signal strength for reliable information transmission to a vehicle. It is a fourth object of the present invention to provide an in situ road marker magnetizing method that utilizes a magnetizing device mounted in a vehicle dedicated to magnetizing and de-magnetizing road markers and cleaning accumulations of foreign materials attracted to road markers.

To achieve the objects described above, the present invention provides a method for in situ magnetizing of road markers that supply road information to vehicles, consisting of the steps of embedding either pre-magnetized or un-magnetized road markers in a road, and then magnetizing or re-magnetizing the road markers embedded in the road with a pattern corresponding to coded road information.

In one embodiment of the present invention, there is provided a magnetizing unit for magnetizing road markers, a code storing unit for storing codes corresponding to road information, and a magnetization control unit for controlling the magnetizing unit so that a road marker is magnetized in situ according to a pattern corresponding to the code stored in the code storing unit. Each road marker is magnetized in situ by the magnetizing unit so as to create a pattern corresponding to coded road information. With the unit described above, the installation of road markers is greatly simplified due to the elimination of the requirement that road workers carefully embed properly polarized road markers.

Further, in the above-described embodiment, road markers magnetized in situ with the magnetizing unit may also be demagnetized in situ with a demagnetizing unit. Also there may be provided an input unit for inputting the road information to be set into a road marker, and a coding unit for encoding the input road information into an appropriate pattern to be stored in the magnetized road markers. With this configuration, it is possible to update road information by demagnetizing and remagnetizing road markers to a new pattern corresponding to coded road information. This method for updating coded road information is vastly simpler and less costly than digging out and re-embedding pre-magnetized road markers.

It is also possible using the method of the current invention to detect the position of magnetized road markers with a detecting unit. Thus, even when the position of an embedded road marker can not be identified from the road surface, the position can be accurately identified with the detecting unit so that road markers can be reliably magnetized and de-magnetized. This makes possible further efficiencies in the process of constructing roads with embedded markers due to the fact that precise positioning of markers becomes less critical. A further embodiment of the detecting unit places the detection unit within a magnetic field generated by an excitation coil so that the position of road markers can be detected by sensing the change in the excitation coil's magnetic field.

Foreign materials attracted to a magnetized road marker may be removed with a cleaning unit. In this embodiment, foreign materials such as iron particles or iron powder can be removed, so that magnetic information provided by a road marker is not distorted and accuracy is preserved. In another embodiment, the detecting unit is used to not only detect the location of a road marker, but also to detect a road marker's polarization and degree of magnetization for maintenance and quality assurance purposes.

A further embodiment of the present invention specifies that magnetic road markers be embedded at standard intervals in the lateral direction across a road. When the magnetic road markers are so spaced, a plurality of magnetizing unit can be similarly spaced so that a plurality of magnetic road markers can be magnetized simultaneously resulting in increased efficiency. In a still further embodiment, a plurality of road markers are embedded along the lateral direction of a road and the magnetizing unit is mounted on the structure of the embodiment so that it can move along the lateral direction of the road. With this configuration, a plurality of road markers embedded along the lateral direction of a road can be magnetized without moving the embodiment of the invention itself A further embodiment of the present invention may be mounted in a vehicle. With this embodiment, magnetizing of road markers occurs as the vehicle passes yielding great efficiency. This efficiency is enhanced in yet another embodiment of the present invention in which the vehicle is automatically piloted.

DETAILED DESCRIPTION OF THE PREFERRED EMBODIMENT

Detailed description is made for the preferred embodiment of the present invention with reference to the attached drawings.

Figure 1:
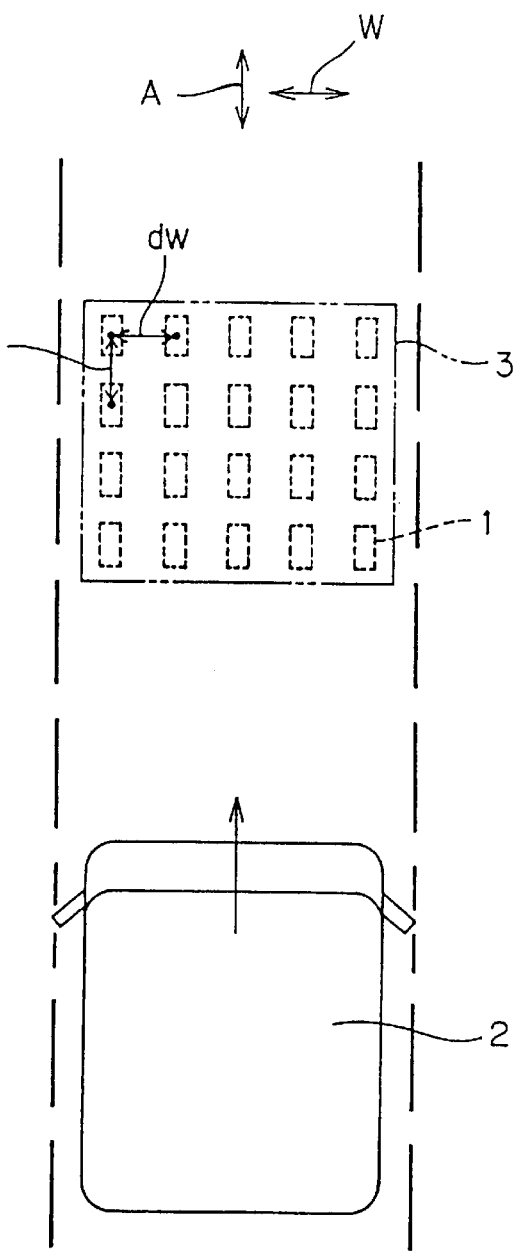
FIG. 1 is a top down view showing the general configuration of a embedded road marker magnetizing system according to one embodiment of the present invention.

FIG. 1 shows a top down view of the general configuration of the preferred embodiment of the present invention. The preferred embodiment magnetizes and demagnetizes road markers 1 embedded in a road with a dedicated vehicle 2. The road markers 1 are grouped and magnetized 3 so as to transmit coded information corresponding to road conditions.

Figure 2:
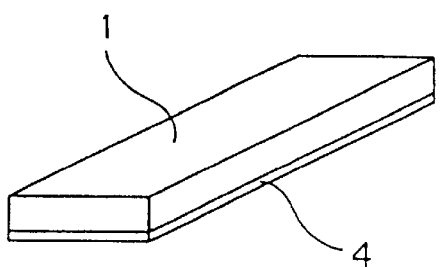
FIG. 2 is a perspective view showing the configuration of a road marker.

A road marker 1 is a rectangular body made from magnetic material such as ferrite. A typical size for a road marker 1 is 5 cm (width)×30 cm (length)×1 cm (thickness) as shown in FIG. 2. However, the present invention is not limited to any particular size of road marker 1. An iron piece (yoke) 4 for collecting a leaked magnetic flux from the road marker 1 is attached to a bottom surface of the road marker 1.

In embedding a group of markers 3, road markers 1 are embedded in a plurality of rows along a lateral direction W of a road as well as along a longitudinal direction A of the road. Tight groups of markers 3 are typically embedded at places in a road where it is essential to convey information to an automatically-piloted vehicle, such as near a tunnel, before a sharp curve, or areas of limited visibility. Lengths of road without special hazards will require less information to be transmitted to an automatically-piloted vehicle and will require fewer embedded road markers 1.

The lateral spacing (dw) and longitudinal spacing (da) of embedded road markers 1 will have a minimum value (dmin). dmin is set to reduce magnetic interference between adjoining road markers 1 to an acceptable level and is determined by the magnetic characteristics of the overall system. Another factor to consider in setting dw and da is the dimensions of the automatically-piloted vehicle.

Programming coded road information into a group of markers 3 is achieved by, for instance, magnetizing a road marker 1 at a corner of the group of markers 3 as a "start" marker and successively magnetizing other markers according to a pattern that conveys coded road information. The present invention is not limited to designating any particular marker as a "start" marker. The present invention is also not limited to any particular coding scheme for magnetizing successive markers.

In addition to road markers 1 embedded in a road, tape-formed road markers adhered to the surface of a road may be used. In addition, either non-magnetized, N-polarity magnetized, or S-polarity magnetized markers may be initially embedded or adhered. A great advantage of the present invention is that magnetization can be imparted or changed in situ which eliminates the need to select a marker with a particular polarity during road construction.

Figure 3:
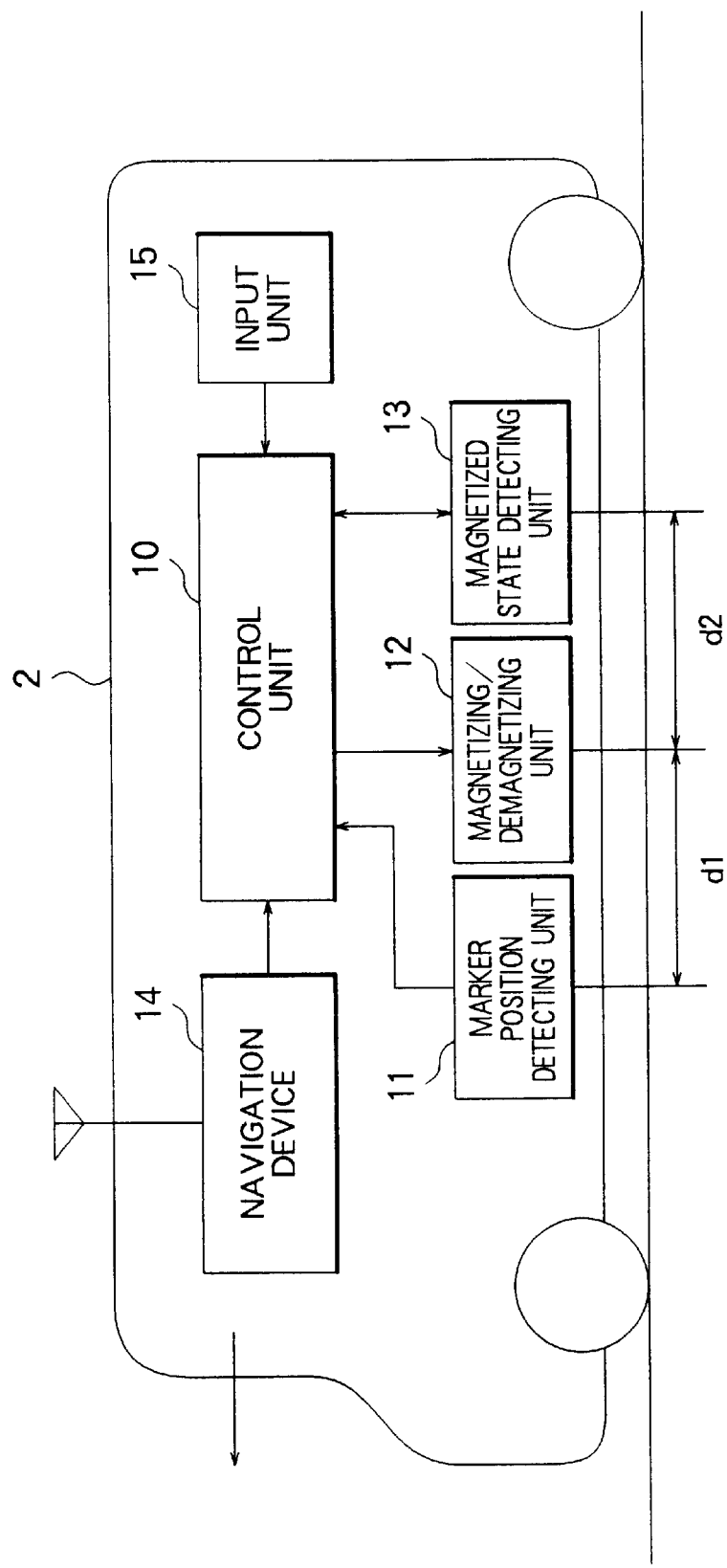
FIG. 3 is a block diagram view showing the internal configuration of a vehicle dedicated to magnetizing road markers.

Referring now to FIG. 3, a block diagram showing a conceptual configuration of a dedicated vehicle 2 is disclosed. The dedicated vehicle 2 has a magnetization control unit (shown as control unit in the drawing) 10 which functions as a controller and comprises, in the preferred embodiment, a computer including a CPU, ROM and/or RAM. The dedicated vehicle 2 has a detecting unit (shown as marker position detecting unit in the drawing) 11 for outputting a position detection signal corresponding to the position of a road marker 1. At a position spaced at distance d1 from the detecting unit 11, there is provided a combined magnetizing-demagnetizing unit (shown as magnetizing-demagnetizing unit in the drawing) 12 for magnetizing or demagnetizing road markers 1 and also for removing foreign materials attracted to the road markers 1 due to magnetic flux. At a position spaced at distance d2 from the combined magnetizing-demagnetizing unit 12, there is provided a second detecting unit (shown as magnetized state detecting unit in the drawing) 13 that is adapted for outputting a signal indicating the magnetized state of a road marker 1.

The magnetization control unit 10 has a code storing unit for storing a coded road information database that stores road information to be imparted to the road markers 1. The magnetization control unit 10 controls the operation of the combined magnetizing-demagnetizing unit 12 in response to signals from the detecting unit 11 so that road markers 1 are properly magnetized to convey the coded road information.

In the preferred embodiment, the dedicated vehicle 2 further includes a navigation device 14 for detecting the current position of the dedicated vehicle 2. The navigation device may be based upon the GPS (Global Positioning System) technology or any other type of technology that accurately determines the current position of the dedicated vehicle 2. In the most preferred embodiment, the navigation device 14 is GPS based and detects a current position of the dedicated vehicle 2 by using kinematic position survey techniques so as to detect the current position of the dedicated vehicle 2 within centimeters. Kinematic position measurement techniques are described in, for instance, "Precise Position Survey System with Satellites", p. 166–67, Nov. 15, 1989, Japan Survey Association.

The navigation device 14 transmits vehicle position data to the magnetization control unit 10.

Further, the dedicated vehicle 2 has an input unit and a coding unit (shown as input unit in the drawing) 15 for inputting instruction data, coding the data, and transmitting the data to the magnetization control unit 10. Instruction data includes, for instance, information on new roads to be changed from time to time such as lane information, intersection information, or temporary construction information.

Figure 4A:
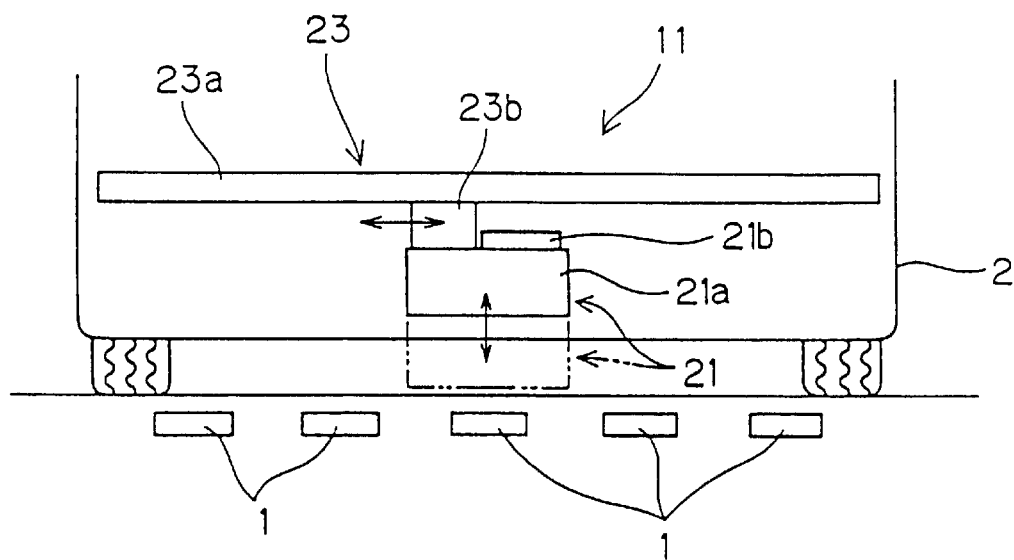
FIG. 4A is a front view showing the embodiment of the present invention in which the detecting unit of the present invention is mounted in a vehicle dedicated to road marker work.
Figure 4B:
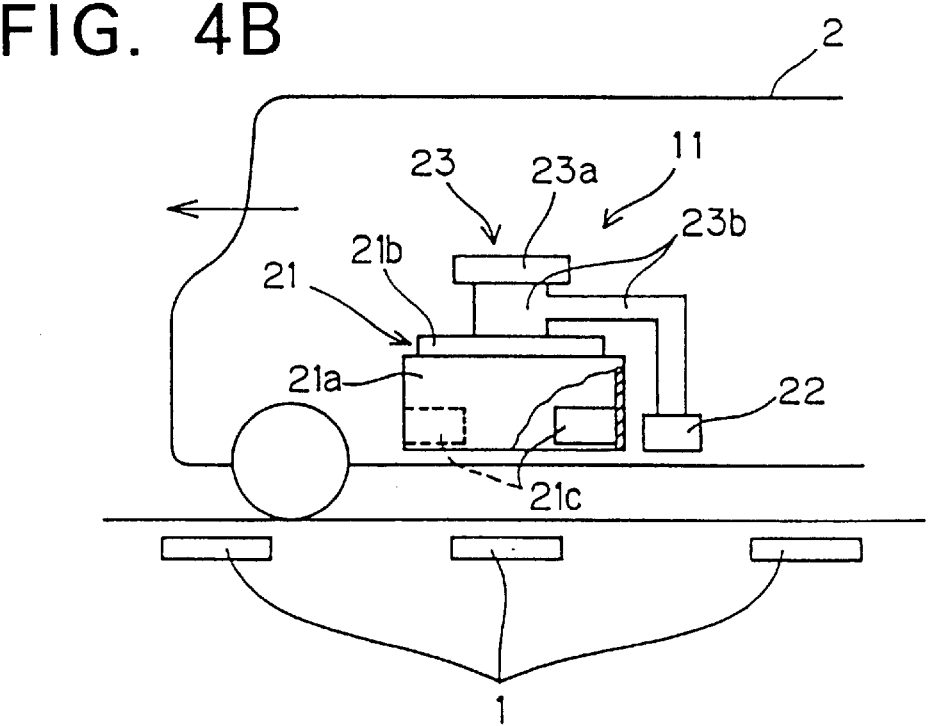
FIG. 4B is a side view showing the embodiment of the present invention in which the detecting unit of the present invention is mounted in a vehicle dedicated to road marker work.

FIG. 4A is a front view showing a preferred configuration of the detecting unit 11. FIG. 4B is a corresponding side view. The detecting unit 11 comprises a position detecting sensor 21 for generating a position detection signal corresponding to the position of a marker 1, a polarity determining sensor 22 for generating a polarity signal corresponding to the polarity of a road marker 1, and a mechanism 23 for moving the position detecting sensor 21 and polarity determining sensor 22 laterally and longitudinally. The moving mechanism 23 has a long base section 23a provided along a lateral direction of the vehicle, and a movable section 23b that can extend vertically and also move longitudinally. The position detecting sensor 21 and polarity determining sensor 22 are attached to the movable section 23b, and can be displaced between a stand-by position indicated by a solid line and a processing position indicated by a double dash line in the FIG. 4A.

The position detecting sensor 21 is made from a conductive material such as aluminum, and has a conductive shield case 21a with a bottom opening, an excitation coil 21b positioned on a top surface of the conductive shield case 21a, and two detection coils 21c provided at symmetrical positions inside the conductive shield case 21a in a longitudinal direction.

The detection of a road marker 1 is described below. (For a more detailed explanation refer to, for instance, "Movement of and guidance for the handicapped people and sensor technology. The handicapped guidance system utilizing ferrite" Wakaumi, Yamauchi, p. 87–88, Sensor Technology, August issue in 1991 Vol. 11, No.8). A magnetic field is generated by the excitation coil 21b. This magnetic field is guided downward along a top surface and a side surface of the conductive shield case 21a. If the road marker 1 is located under the position detecting sensor 21, then the road marker 1 forms a reverse magnetic field, so that the magnetic field distribution near the detection coil 21c changes.

Magnetic fluxes generated by the two detection coils 21c and passing through each coil have substantially the same value when a road marker 1 is located between and substantially equidistant from the two detection coils 21c. On the other hand, when a road marker 1 is located closer one of the detection coils 21c, the magnetic flux generated by the detection coil closer to the road marker 1 is stronger than that generated from the other detection coil 21c. The position sensor 21 converts the relative magnetic flux of the detection coils 21c into a position detection signal.

The polarity determining sensor 22 is a magnetism sensor such as, among other things, a Hall element, a magneto resistive Wheatstone bridge, or a flux gate type magnetism sensor. In the preferred embodiment, the polarity determining sensor 22 can detect magnetic strength as well as the polarity of a road marker 1.

Figure 5A:
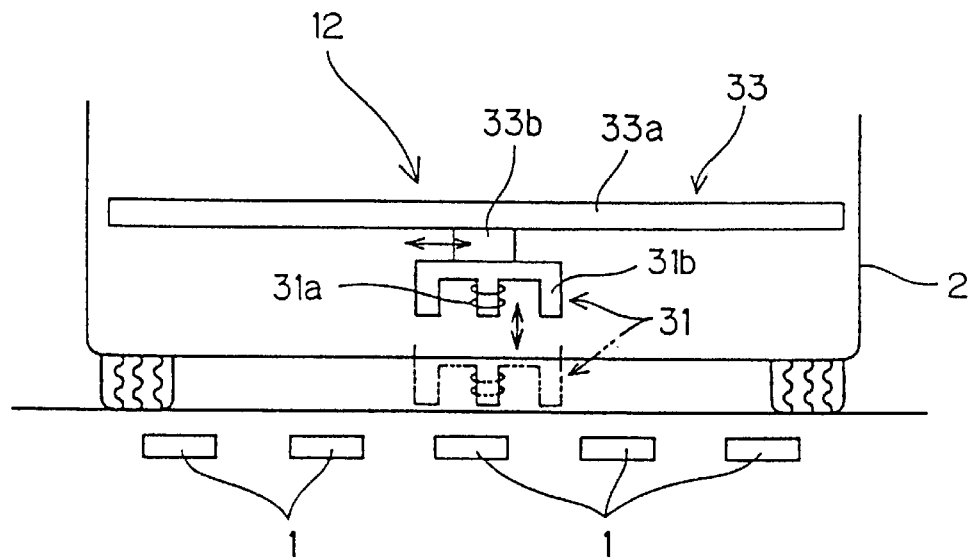
FIG. 5A is a front view showing the embodiment of the present invention in which the magnetizing unit and demagnetizing unit of the present invention are mounted in a vehicle dedicated to road marker work.
Figure 5B:
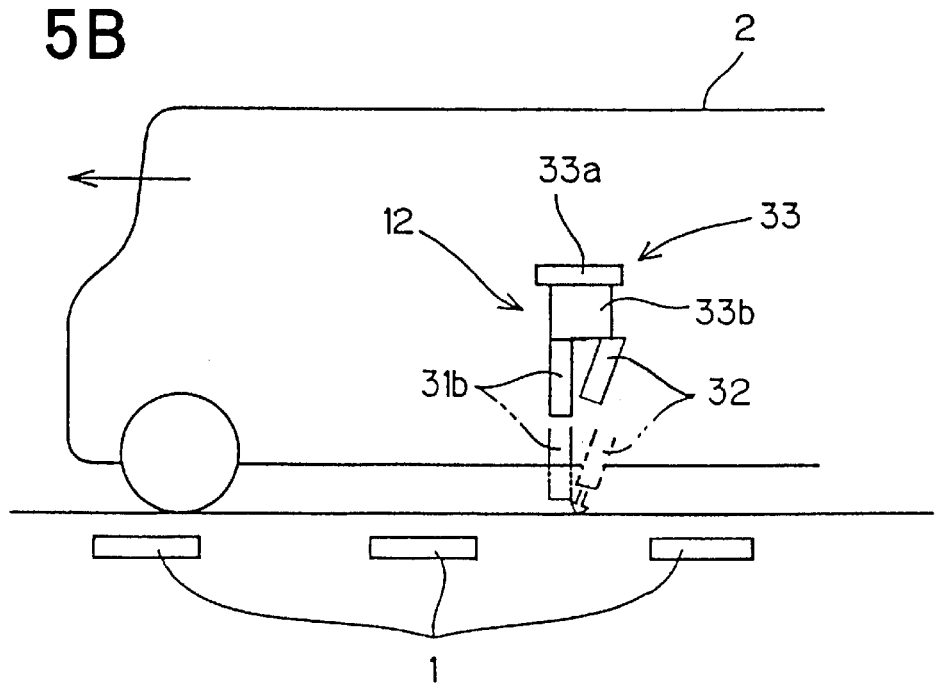
FIG. 5B is a side view showing the embodiment of the present invention in which the magnetizing unit and demagnetizing unit of the present invention are mounted in a vehicle dedicated to road marker work.

FIG. 5A is a front view showing the dedicated vehicle 2 with a combined magnetizing-demagnetizing unit 12. FIG. 5B is a side view of the same. The magnetizing-demagnetizing unit 12 comprises a magnetizing-demagnetizing coil 31 with a coil section 31a for generating a magnetic field, a magnetism shield section 31b of conductive material for collecting magnetic flux generated by the coil section 31a, an air nozzle 32 from blowing away accumulated iron particles, and a moving mechanism 33 having configuration similar to that of moving mechanism 23 described above. The magnetism shield section 31b and air nozzle 32 are attached to the movable section 33b, and can move between the stand-by position indicated by a solid line and a processing position indicated by a double dashed line in FIGS. 5A and 5B.

Figure 6A:
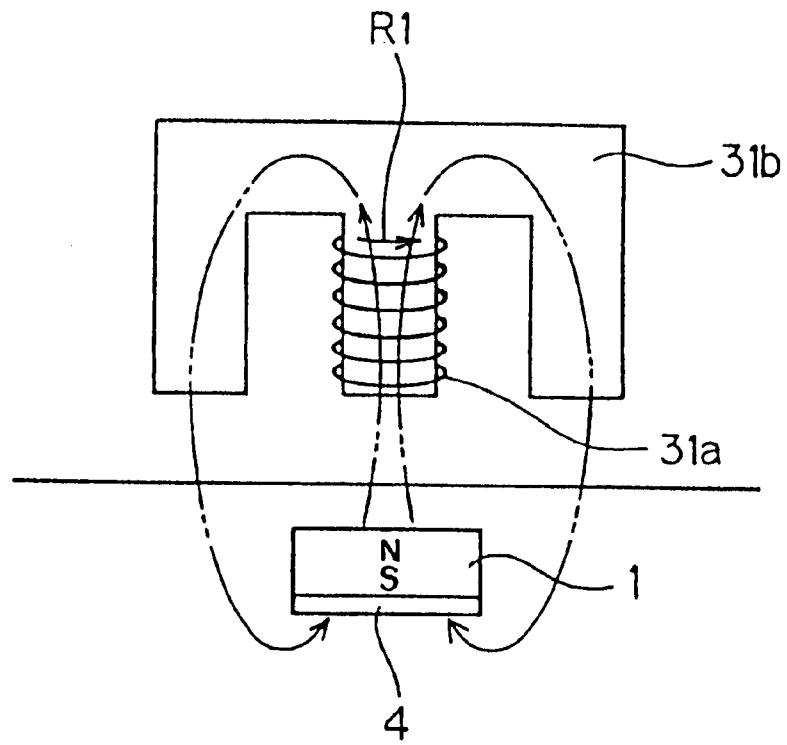
FIG. 6A is an abstract view showing the process of demagnetizing a road marker from a South polarity or magnetizing a road marker to a North polarity.
Figure 6B:
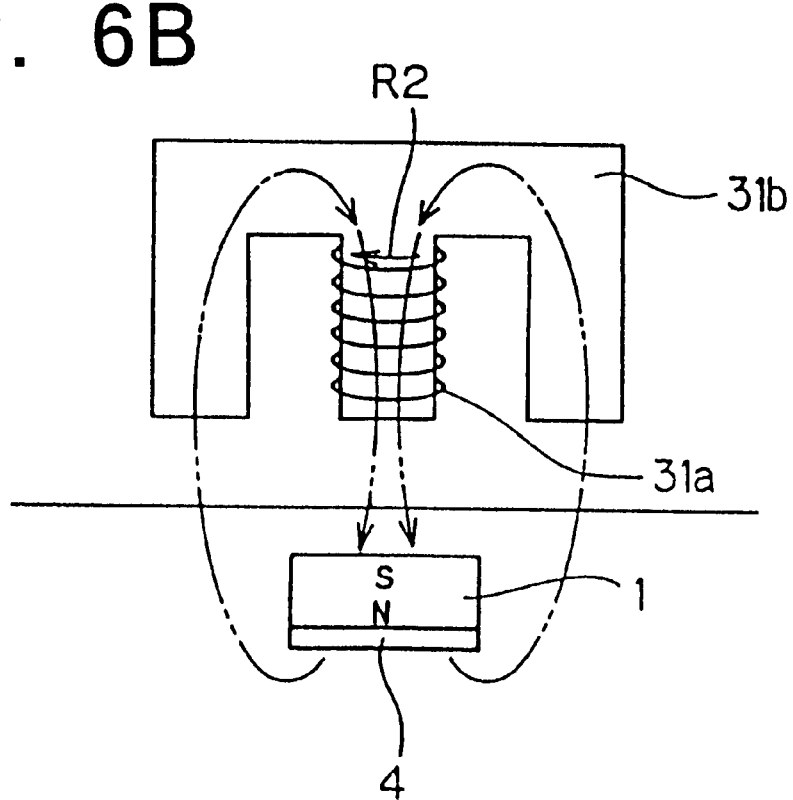
FIG. 6B is an abstract views showing the process of demagnetizing a road marker from a North polarity or magnetization a road marker to a South polarity.

Referring now to FIG. 6A, when current flows along a first feed direction (R1) in the coil section 31a, a magnetic field is generated in the coil section 31a from bottom to top as shown by the double dashed line. This magnetic field magnetizes road marker 1 so that the top edge of the road marker 1 is magnetized with N-polarity. As shown in FIG. 6B, when current flows in an opposite feed direction (R2) in the coil section 31a, a reversed magnetic field is generated which magnetizes road marker 1 so that the top edge of the road marker 1 is magnetized with S-polarity. In order to magnetize road marker 1, the generated magnetic field must have an intensity approximately 3 times greater than the magnetic field of the road marker 1. More specifically, when ferrite is used in the road marker 1, the intensity of the generated magnetic field must be around 10.5 KOe to overcome the natural coercive force of ferrite which is around 3.5 KOe.

Demagnetization of a road marker 1 is achieved by generating a magnetic field of opposite polarity with an intensity substantially equal to a coercive force of the road marker 1. More specifically, the current must flow in the R2 direction in coil section 31a to demagnetize a road marker 1 whose top edge initially has N-polarity. Likewise, current must flow in the R1 direction in coil section 31a to demagnetize a road marker 1 whose top edge initially has S-polarity.

Figure 7:
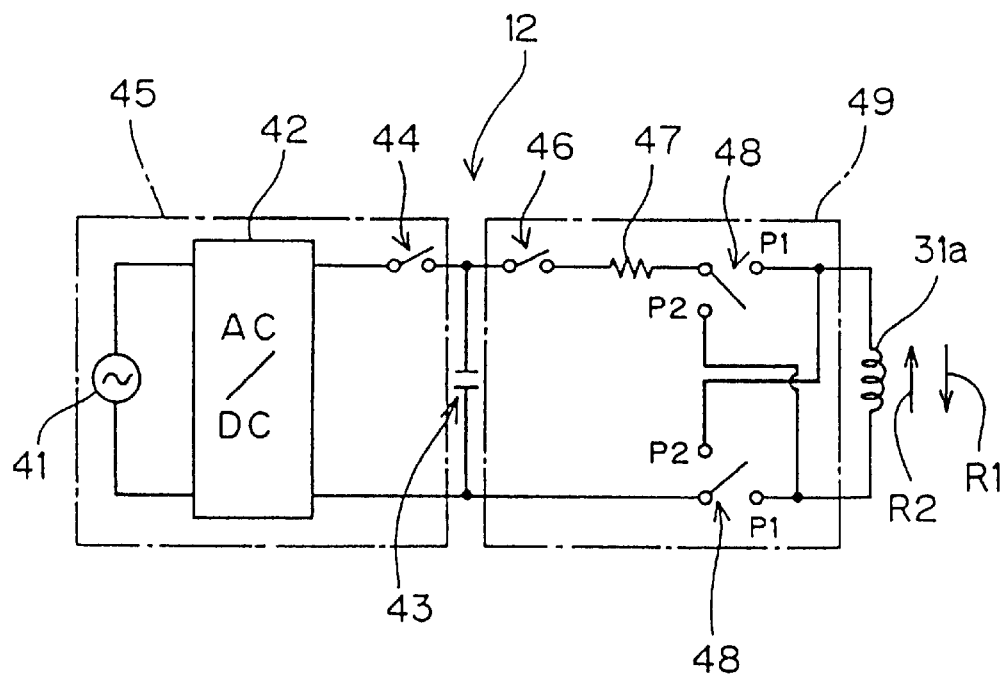
FIG. 7 is a circuit diagram showing sample circuitry for a combined magnetizing-demagnetizing unit.

FIG. 7 is a circuit diagram showing configuration of the combined magnetizing-demagnetizing unit 12, and mainly shows a structure for feeding an electric current to the coil section 31a. The magnetizing-demagnetizing unit 12 has an AC current source 41, an AC/DC converting circuit 42 for converting an AC voltage generated in the AC current source 41 to a DC voltage, and a charging circuit 45 having a charge switch 44 which is turned on when a capacitor 43 is to be charged. Further the magnetizing-demagnetizing unit 12 comprises a magnetizing-demagnetizing circuit 49 having a discharge switch 46 which is turned on when the capacitor 43 is to be discharged, a current adjusting resistor 47, and a select switch 48 for selecting either the first feed direction R1 or second feed direction R2 for the discharged current into coil section 31a.

To charge the capacitor 43, the charge switch 44 is turned on with the discharge switch 46 and select switch 48 turned off. To discharge the capacitor 43 and feed current to the coil section 31a, the charge switch 44 is turned off and the charge switch 46 is turned on. The select switch 48 is switched to control the current direction through coil section 31a so that road marker 1 is demagnetized or magnetized with N-polarity or S-polarity. Specifically, to demagnetize an S-polarity road marker 1 or to magnetize a road marker 1 with N-polarity, the select switch 48 is positioned to connect terminal P1 and cause current flow in direction R1. Likewise, to demagnetize an N-polarity road marker 1 or to magnetize a road marker 1 with S-polarity, the select switch 48 is positioned to connect terminal P2 and cause current flow in direction R2.

Figure 8:
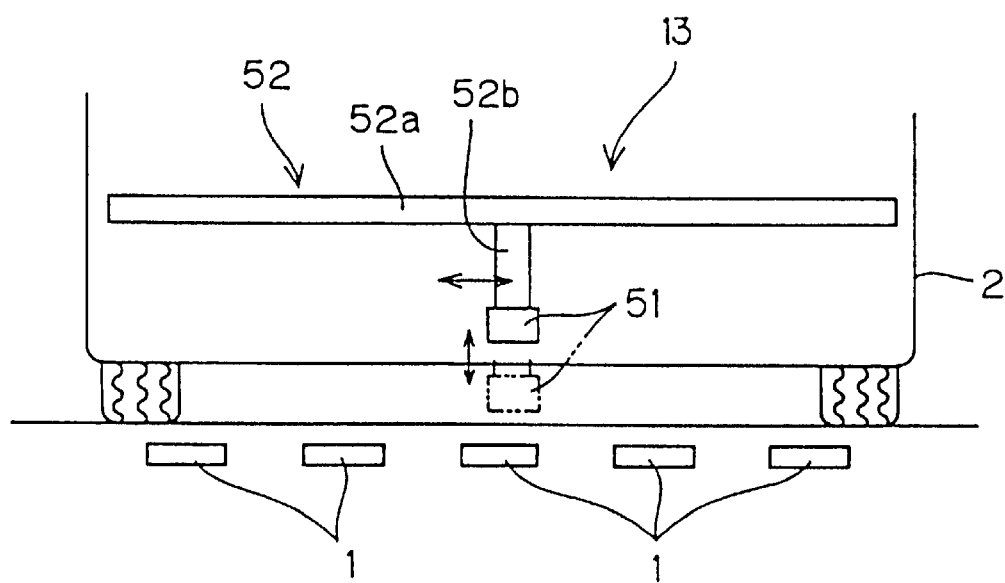
FIG. 8 is a front view showing the embodiment of the present invention in which the detecting unit of the present invention is mounted in a vehicle dedicated to road marker work.

FIG. 8 is a front view showing dedicated vehicle 2 and the detecting unit configured as a magnetic, state detecting unit 13. The magnetized state detecting unit 13 comprises a magnetized state detecting sensor 51, and a moving mechanism 52 having a configuration similar to that of the moving mechanism 23. The magnetized state detecting sensor 51 is attached to a movable section 52b, and can be moved between a stand-by position indicated by a solid line and a processing position indicated by a double dash line. The magnetized state detecting sensor 51 is similar in construction to the polarity determining sensor 22.

Figure 9:
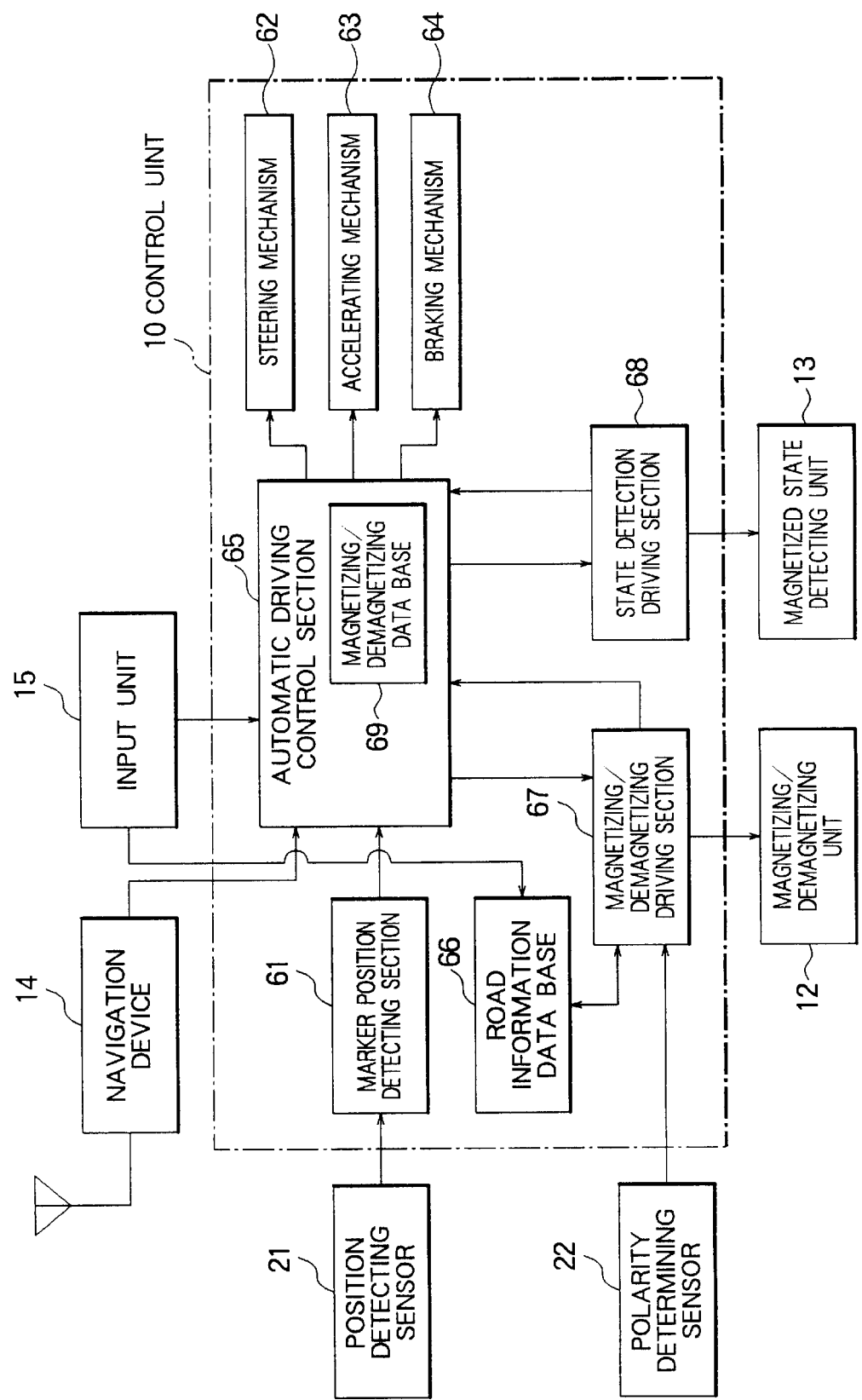
FIG. 9 is a block diagram showing the functions and configuration of the magnetization control unit.

FIG. 9 is an amplified version of the system block diagram previously discussed above and shown in FIG. 3. FIG. 9 focuses upon the magnetization control unit (shown as control unit in the drawing) 10. The magnetization control unit 10 has a marker position detecting section 61 for receiving the signal from the position detecting sensor 21 and outputting a trigger signal to the automatic driving control section 65. Automatic driving control section 65 controls steering mechanism 62, accelerating mechanism 63, and braking mechanism 64 according the trigger signal from the marker position detecting section 61 and vehicle position data from the navigation device 14.

The magnetization control unit 10 also controls a magnetizing-demagnetizing driving section 67 for driving the magnetizing-demagnetizing unit 12 in accordance with the polarity determination signal from the polarity determining sensor 22, road information from the road information data base 66. The magnetization control unit 10 also controls a magnetized state detection driving section 68 that drives the magnetized state detecting unit 13. The automatic driving control section 65 has a magnetizing-demagnetizing data base 69 in which data required for magnetization and demagnetization is stored. The data includes vehicle-specific data such as first distance (d1) between the marker position detecting unit 11 and the magnetizing-demagnetizing unit 12 and second distance (d2) between the magnetizing-demagnetizing unit 12 and the magnetized state detecting unit 13. The data also includes marker correlation data and road information data. The marker correlation data includes coordination data such as the location of a "start" marker for a group 3 of markers, the locations of other markers forming the group 3 of markers, and marker spacing (da and dw).

The road information data base 66 stores positional and road condition information such as horizontal state, lane information, branching and intersecting information, dimensional information such as width, construction information, and any other type of useful information in an encoded state. Road information is stored in correlation to each position on a road. Further, road information is stored in correlation to any group of markers embedded in a road. Road information stored in the road information data base 66 is periodically updated with an input unit 15. New road information is put into the system through the input unit 15, is encoded in the magnetization control unit 10, and is written to the road information data base 66.

The magnetization control unit 10 starts its operations when the dedicated vehicle 2 is run to a position near the group of markers 3 and the running mode is switched to automatic via the input unit 15. The automatic driving control section 65 controls the dedicated vehicle 2 according to data coordinates for the "start" marker, road map data stored in the magnetizing-demagnetizing data base 69, and positional data from the navigation device 14 so that the dedicated vehicle is positioned with the magnetizing-demagnetizing coil 31 directly over the "start" marker. Thereafter, the automatic driving control section 65 commands the dedicated vehicle 2 to drive slowly along the road in response to further inputs.

Marker position detecting section 61 continuously compares the value of the position detection signal from the position detection sensor 21 against a threshold value. When the value of the position detection signal is above the threshold value, it means that the position detecting sensor 21 is located over one edge of a road marker which causes a trigger signal to be sent from the marker position detecting section 61 to the automatic driving control section 65 to indicate the location of the road marker. Thereafter, the automatic driving control section 65 determines when the magnetizing-demagnetizing unit 12 is located over the road marker 1 with a time and speed calculation. At the same time, polarity determining sensor 22 detects the polarity of the road marker 1 and transmits a corresponding signal to the magnetization-demagnetization driving section 67. The automatic driving control section 65 stops the dedicated vehicle 2 when magnetizing-demagnetizing coil 31 is positioned directly over the marker 1. The automatic driving control section 65 then directs the magnetization-demagnetization driving section 67 to lower the magnetizing-demagnetizing coil 31. The magnetizing-demagnetizing unit checks the polarity and strength of the magnetism of the road marker and, if the road marker is improperly polarized, electric current is fed to the coil section 31a so as to demagnetize and/or properly magnetize the road marker 1 according to road information stored in the road information data base 66. In addition, upon a trigger signal is from the automatic driving section 65, air is exhausted from the air nozzle 32 to blow away iron particles or other foreign materials adhered to the road in the road marker location.

Upon completion of "start" marker maintenance, the magnetization-demagnetization driving section 67 executes the same process at a laterally adjoining marker. Upon completion of a lateral row of markers, the dedicated vehicle 2 under control of the automatic driving control section so as to position the magnetized state detecting unit 13 directly over the "start" marker for quality assurance. The magnetized state detecting unit 13 evaluates all markers in a lateral row and sends signal triggers to the automatic driving section 65. If any marker is incorrectly magnetized, then the automatic driving control section 65 repositions the dedicated vehicle 2 and controls the magnetizing-demagnetizing unit 12 to correct the deficiency. This process is then repeated on the successive lateral rows of markers 1 until the entire group 3 has been properly magnetized.

An alternative embodiment of the present invention is to provide a plurality of magnetizing-demagnetizing units 12 laterally spaced at length dw to match the spacing of embedded road markers 1. This allows batch magnetizing of road markers 1 thus increasing the efficiency of the process.

The above embodiment has been described in relation to magnetizing road markers to provide road information to a vehicle, but the invention is equally applicable to magnetizing road markers to indicate the location of lane boundaries to prevent an automatically-piloted vehicle from exiting said boundaries.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A device for magnetizing a road marker for providing road information to vehicles comprising:

a magnetizing unit;

a cleaning unit for removing foreign materials attracted by said magnetized road marker;

a code storing unit that contains coded road information; and a magnetization control unit that controls the magnetizing unit;

wherein the magnetization control unit controls the magnetizing unit so that said road marker is magnetized according to a pattern reflecting said coded road information.

2. The device for magnetizing a road marker according to claim 1 further including a demagnetizing unit.

3. The device for magnetizing a road marker according to claim 1 further including a road marker position detecting unit.

4. The device for magnetizing a road marker according to claim 3 wherein said road marker position detecting unit further includes:

an excitation coil that generates a magnetic field; and a magnetic field detecting coil provided within said magnetic field for detecting changes in said magnetic field.

5. The device for magnetizing a road marker according to claim 1 further including a magnetized state detecting unit to detect the magnetized state of said road marker.

6. The device for magnetizing a road marker according to claim 5 wherein said magnetized state detecting unit is also able to detect the magnetic flux density of said road marker.

7. The device for magnetizing a road marker according to claim 1 wherein a plurality of said road markers are provided at a specified lateral spacing across a road and a plurality of said magnetizing units are provided at said specified lateral spacing across a road so that the plurality of road markers can be simultaneously magnetized.

8. The device for magnetizing a road marker according to claim 1 wherein a plurality of said road markers are provided at a specified lateral spacing across a road and a single magnetizing unit is moved by a moving unit along said lateral direction across a road so as to magnetize said plurality of road markers.

9. The device for magnetizing a road marker according to claim 2 wherein a said device for magnetizing road markers is mounted on a dedicated vehicle.

* * * * *